(12) United States Patent
Walp et al.

(10) Patent No.: US 8,665,491 B2
(45) Date of Patent: Mar. 4, 2014

(54) MECHANISM FOR APPLYING FORMULA BASED TRANSFORMATIONS IN A COLOR MANAGEMENT WORKFLOW

(75) Inventors: Jason C. Walp, Louisville, CO (US); Edward Hattenberger, Firestone, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 514 days.

(21) Appl. No.: 12/985,468

(22) Filed: Jan. 6, 2011

(65) Prior Publication Data

US 2012/0176631 A1    Jul. 12, 2012

(51) Int. Cl.
*H04N 1/60* (2006.01)

(52) U.S. Cl.
USPC ............. 358/1.9; 358/518; 358/520; 358/529

(58) Field of Classification Search
USPC ........ 358/1.9, 518, 520, 523, 524, 1.15, 1.16, 358/529; 345/601, 602
See application file for complete search history.

(56) References Cited

U.S. PATENT DOCUMENTS

| | | | | |
|---|---|---|---|---|
| 6,480,299 B1 * | 11/2002 | Drakopoulos et al. | .......... | 358/1.9 |
| 6,580,524 B1 * | 6/2003 | Weichmann et al. | .......... | 358/1.9 |
| 6,680,740 B2 * | 1/2004 | Krueger | .................. | 345/601 |
| 6,778,300 B1 * | 8/2004 | Kohler | .................... | 358/529 |
| 7,095,529 B2 * | 8/2006 | Krueger et al. | ................. | 358/1.9 |
| 7,209,261 B2 * | 4/2007 | Krueger et al. | ................. | 358/1.9 |
| 7,298,527 B2 * | 11/2007 | Yabe | ................................. | 358/1.9 |
| 7,433,511 B2 | 10/2008 | Jacob | | |
| 7,468,813 B1 * | 12/2008 | MacLeod | ........................ | 358/1.9 |
| 7,605,945 B2 | 10/2009 | Kondo | | |
| 7,643,175 B2 | 1/2010 | Tai et al. | | |
| 7,751,085 B2 * | 7/2010 | Yabe | ................................. | 358/1.9 |
| 7,796,299 B1 * | 9/2010 | MacLeod | ........................ | 358/1.9 |
| 7,944,583 B2 * | 5/2011 | Yabe | ................................. | 358/1.6 |
| 8,059,134 B2 * | 11/2011 | Bala et al. | ...................... | 345/589 |
| 8,184,334 B2 * | 5/2012 | Yamakawa et al. | ............ | 358/1.9 |
| 2003/0098986 A1 * | 5/2003 | Pop | .................................. | 358/1.9 |
| 2004/0036695 A1 * | 2/2004 | Pethania et al. | ............... | 345/601 |
| 2004/0196475 A1 * | 10/2004 | Zeng et al. | ...................... | 358/1.9 |
| 2005/0047649 A1 * | 3/2005 | Jacob | .............................. | 382/162 |
| 2005/0195415 A1 * | 9/2005 | De Baer | .......................... | 358/1.9 |
| 2005/0270587 A1 * | 12/2005 | Yamakawa et al. | ........... | 358/448 |
| 2007/0109565 A1 * | 5/2007 | Presley et al. | ................... | 358/1.9 |
| 2007/0201061 A1 * | 8/2007 | Miller | ............................. | 358/1.9 |
| 2008/0212113 A1 * | 9/2008 | Kim | .................................. | 358/1.9 |
| 2009/0086272 A1 * | 4/2009 | Januszewski et al. | ........ | 358/1.17 |
| 2009/0310152 A1 | 12/2009 | Roulland et al. | | |
| 2009/0310154 A1 * | 12/2009 | Morovic et al. | ................. | 358/1.9 |
| 2010/0149559 A1 | 6/2010 | Morales et al. | | |
| 2010/0157372 A1 | 6/2010 | Qiao et al. | | |
| 2010/0214616 A1 | 8/2010 | Fan et al. | | |
| 2010/0265524 A1 * | 10/2010 | Muramatsu | ..................... | 358/1.9 |
| 2011/0280589 A1 * | 11/2011 | Chandu et al. | .................. | 399/15 |
| 2012/0038938 A1 * | 2/2012 | Oh et al. | ......................... | 358/1.9 |

* cited by examiner

*Primary Examiner* — Kimberly A Williams

(74) *Attorney, Agent, or Firm* — Blakely, Sokoloff, Taylor & Zafman LLP

(57) ABSTRACT

A method is disclosed. The method includes receiving a print job to be printed, determining if the print job is to be processed according to a formula based workflow and invoking formula based International Color Consortium (ICC) profiles to perform color transformations if the print job is determined to be processed according to the formula based workflow.

20 Claims, 3 Drawing Sheets

MECHANISM FOR APPLYING FORMULA BASED TRANSFORMATIONS IN A COLOR MANAGEMENT WORKFLOW

FIELD OF THE INVENTION

This invention relates generally to the field of printing systems. More particularly, the invention relates to implementing a formula based workflow in a color management workflow.

BACKGROUND

Growth in color management has resulted in an increase in software packages that are used to generate International Color Consortium (ICC) profiles. ICC profiles describe color attributes of a particular device or viewing requirement by defining a mapping between a source or target color space and a Profile Connection Space (PCS), such as either CIELAB (L*a*b*) or CIEXYZ.

A fundamental design of an ICC-based color managed workflow is the use of the PCS as an independent space between all devices, which has an advantage of requiring the characterization of the relationship between only the device and the PCS. A connection to any other device may then be made through the PCS.

However, if another device does not use an ICC-based color managed workflow (e.g., red, green blue (RGB) to cyan, magenta, yellow, black (CMYK) conversion), matching the color transformations of this device becomes much more difficult, especially if the device is using formulas independent of the characteristics of the device such as paper type, toner color, or ink density.

These non-color managed workflows often have no configurability and may differ from one printer or print server to the next. Moreover, a system that performs color management has no ability to implement a device dependent formula based workflow.

As a result, a mechanism for implementing a formula based workflow in a color management workflow is desired.

SUMMARY

In one embodiment, a method is disclosed. The method includes receiving a print job to be printed, determining if the print job is to be processed according to a formula based workflow and invoking formula based International Color Consortium (ICC) profiles to perform color transformations if the print job is determined to be processed according to the formula based workflow.

In another embodiment, a printer is disclosed. The printer includes a control unit to process and render a print job and a color management unit to perform color transformations for received print jobs. The color management unit includes formula based International Color Consortium (ICC) profiles invoked by the control unit to perform a device dependent transformation on the print job using a color managed workflow upon indication that the print job is to be processed according to a formula based workflow.

BRIEF DESCRIPTION OF THE DRAWINGS

A better understanding of the present invention can be obtained from the following detailed description in conjunction with the following drawings, in which.

DETAILED DESCRIPTION

A mechanism for implementing a formula based workflow in a color management workflow is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
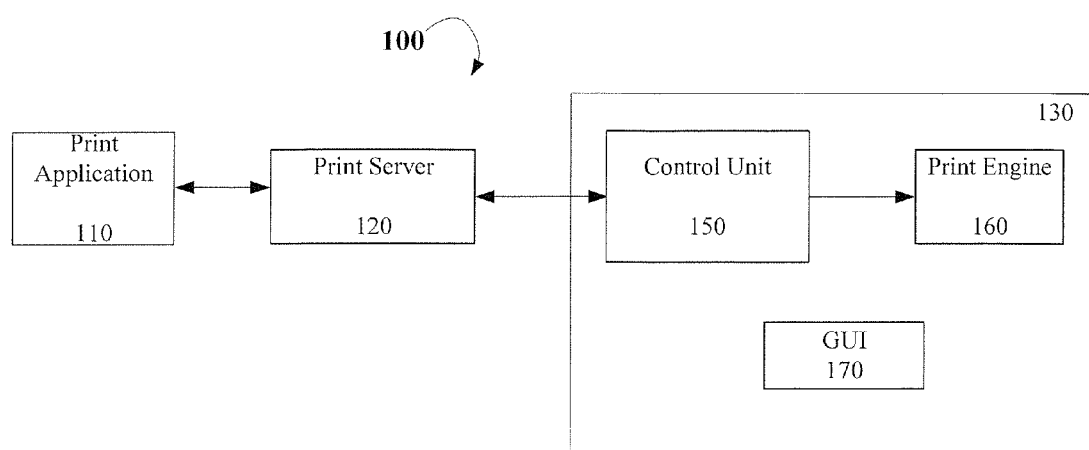
FIG. 1 illustrates one embodiment of a printing system.

FIG. 1 illustrates one embodiment of a printing system 100. Printing system 100 includes a print application 110, a server 120 and printer 130. Print application 110 makes a request for the printing of a document. In one embodiment, print application 110 provides AFP, PS and PDF files for printing to print server 120.

Figure 2:
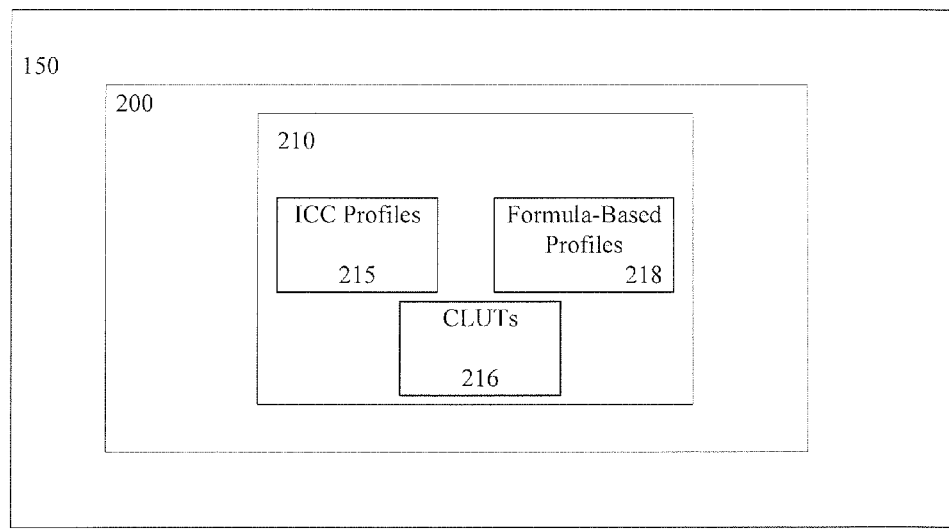
FIG. 2 illustrates one embodiment of a control unit.

Printer 130 includes a control unit 150 and a print engine 160. According to one embodiment, control unit 150 processes and renders objects received from print server 120 and provides sheet maps for printing to print engine 160. FIG. 2 illustrates one embodiment of a control unit 150. Control unit 150 includes a rasterizer 200.

Rasterizer 200 is implemented to process image objects received at control unit 150 by performing a raster image process (RIP) to convert an image described in a vector graphics format (e.g., shapes) into a raster image (e.g., pixels) that is to be stored as scan line data in a memory array (not shown) for output to print engine 160.

Rasterizer 200 includes a color management unit 210 that provides a color mapping from a source to a destination color space. In one embodiment, color management unit 210 uses ICC profiles to perform a color managed workflow by mapping to determine CMYK values for each pixel in a particular object to be printed at print engine 160. According to one embodiment, color management unit 210 includes ICC profiles 215, color lookup tables (CLUTs) 216 and formula based profiles 218.

ICC profiles 215 include various profiles used to print full color print jobs. CLUTs 216 support ICC profiles 215 and formula based profiles 218 used in printer 100 to enable the use of different color transforms, where each transform is tailored for a different effect. According to one embodiment, each profile includes up to 6 CLUT's, three for input (e.g., AtoB tables to convert from device space to PCS, and three for output (e.g., BtoA tables to convert from PCS to device space).

In one embodiment, formula based profiles 218 perform a formula based workflow while implementing an ICC color workflow. In such an embodiment, formula based profiles unit 218 manipulates the ICC format using a shaping matrix to convert RGB to CMYK based on a process. The first step of the process includes converting RGB to CMY by setting Cyan channel=100% Red channel; Magenta channel=100%

Green channel; Yellow channel=100% Blue channel; and Black channel=minimum of Cyan, Magenta, Yellow channels. The second step includes processing the Cyan, Magenta, and Yellow channels based on the Black channel. The final step includes converting CMY to CMYK by computing black generation on the black channel based on a nominal black value.

Figure 3:
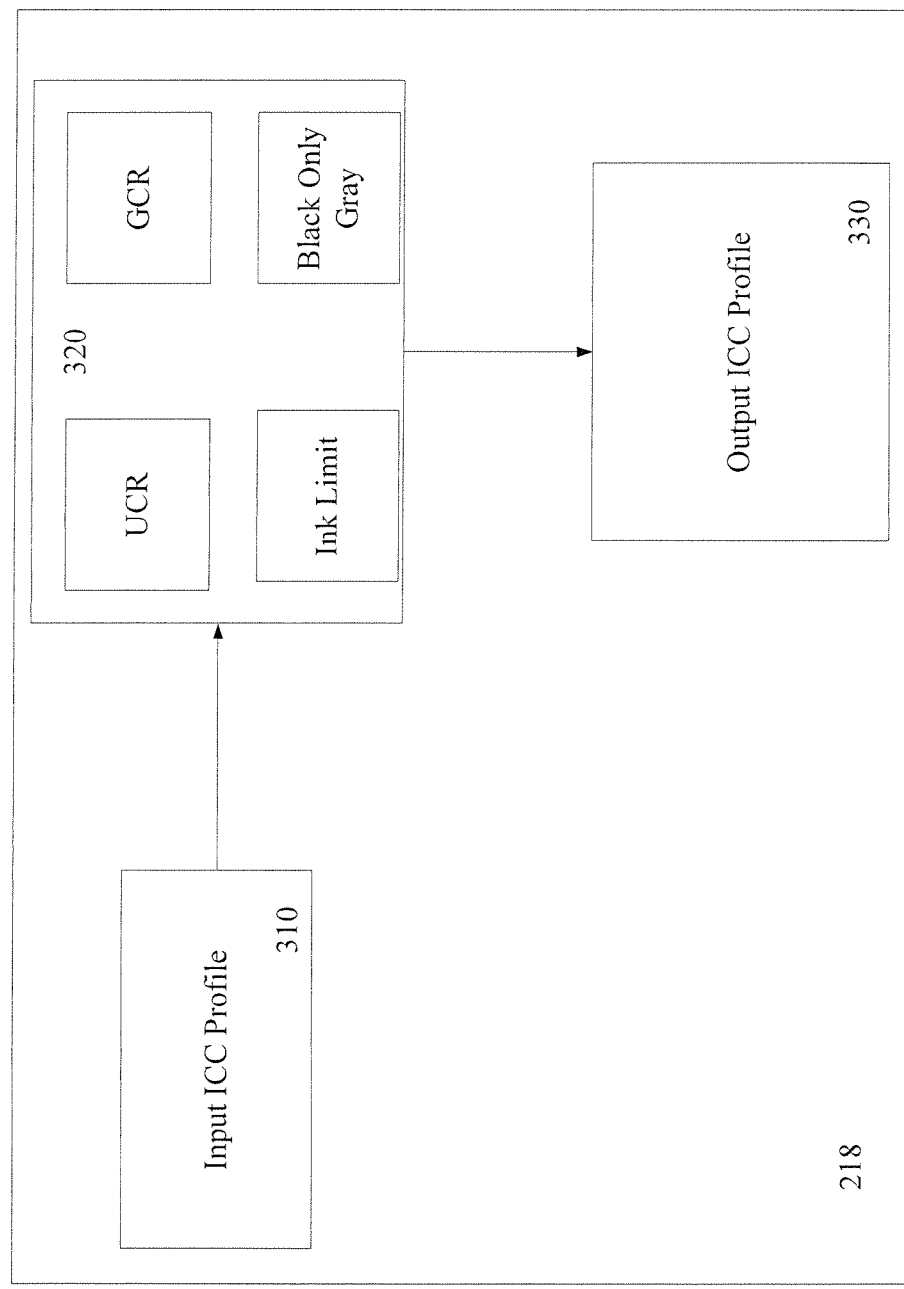
FIG. 3 illustrates one embodiment of a components implemented at a formula based profile system.

FIG. 3 illustrates one embodiment of components implemented by a formula based profile 218 to perform the above-described process. In one embodiment, an input ICC profile 310 uses the PCS to convey the first step of the converted RGB to CMY, rather than CIELab or CIEXYZ. A color module 320 performs the second step of processing the Cyan, Magenta, and Yellow channels based on the Black channel.

According to one embodiment, color module 320 performs the CMY to CMYK transformation based on modifications of the Cyan, Magenta, and Yellow channels. In one embodiment, color module 320 may perform the CMY to CMYK conversion using one of Under Color Removal (UCR), Gray Component Replacement (GCR), ink limited secondary colors, black only gray point, etc.

In a further embodiment, each of the options for the profile is stored in the BtoA tables of CLUTs 216. The options are used to change the device response based upon a selected a rendering intent corresponding to each option. In other embodiments, the processing performed by color module 320 may be bypassed. However, bypassing color module 320 may result in saturated colors with a maximum of 400% ink usage.

An output ICC profile 330 conveys the CMY to CMYK transformation based upon a color processing option indicated by rendering intent. Referring back to FIG. 2, control unit 150 identifies and controls print jobs that are to perform a formula based workflow. In this embodiment, control unit 150 invokes one of formula based profiles 218 whenever a print job is identified having to perform a formula based workflow.

In one embodiment, a print job is selected for formula based processing by an operator using a Graphical User Interface (GUI) 170 at printer 130. In such an embodiment, the operator selects a particular formula based profile to be used, along with the rendering intent, which invokes control unit 150 to select the corresponding profile 218.

In another embodiment, the operator may select one of a list of print job jobs at GUI 170, where each print job is designated as either color managed or formula. Upon selection of the print job control unit 150 invokes one of ICC profiles 216 or formula based profiles 218 based upon the selection. In other embodiments, the selections may be made at print application 110 and transmitted through server 120 to printer 130 via the print job data stream.

Figure 4:
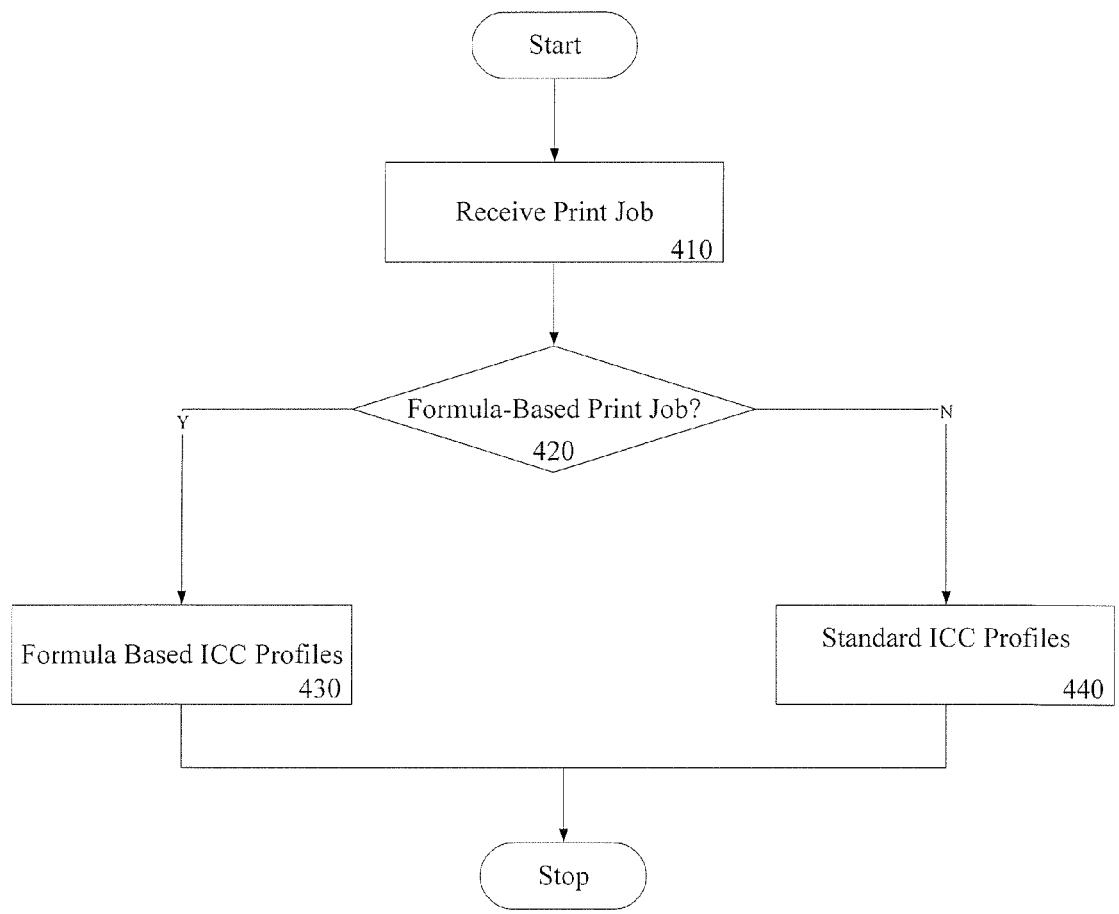
FIG. 4 is a flow diagram illustrating one embodiment of a process for performing color management.

FIG. 4 is a flow diagram illustrating one embodiment of a process for performing color management at printer 103. The process may be performed by processing logic that may comprise hardware (e.g., circuitry, dedicated logic, programmable logic, microcode, etc.), software (such as instructions run on a processing device), or a combination thereof. In one embodiment, the process is performed by color management unit 210 described with respect to FIG. 2.

At processing block 410, a print job is received at printer 103. At decision block 420, it is determined whether the print job implements a formula based workflow. If so, one of formula based profiles 218 is invoked as discussed above with reference to FIG. 3, processing block 430. If it is determined that the print job implements a color managed workflow, one of color profiles 215 is invoked, processing block 340.

The above-described mechanism enables a printer that typically uses a color managed workflow to perform device dependent transformations that implement formula based color modifications.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A printer comprising:
   a control unit to process and render a print job; and
   a color management unit to perform color transformations for received print jobs, the color management unit including formula based International Color Consortium (ICC) profiles invoked by the control unit to perform a device dependent transformation on the print job using a color managed workflow upon indication that the print job is to be processed according to a formula based workflow, wherein the formula based profiles manipulate an ICC format using a shaping matrix.

2. The printer of claim 1 wherein the color management unit further comprises ICC profiles to profiles invoked by the control unit to perform a color managed transformation on the print job upon indication that the print job is to be processed according to a color managed workflow.

3. The printer of claim 2 wherein the formula based ICC profiles comprise:
   an input profile to use a Profile Connection Space (PCS) to convey a conversion of a source device color to a target device color;
   a color module to generate a black channel of the target device color; and
   an output profile to convey the black channel generation.

4. The printer of claim 3 wherein the color module performs color modifications on the black channel of the target device color.

5. The printer of claim 4 wherein the color modifications comprise one of Under Color Removal (UCR), Gray Component Replacement (GCR), ink limited secondary colors, black only gray point.

6. The printer of claim 5 wherein the color management unit further comprises color lookup tables to store the output profile and each of the color modifications.

7. The printer of claim 6 wherein the color modifications are used to change a device response based upon a selected rendering intent corresponding to each color modification.

8. The printer of claim 2 further comprising a graphical user interface (GUI) to enable an operator to select the print job to be processed according to the formula based workflow.

9. The printer of claim 8 further wherein the control unit identifies the print job based upon the selection at the GUI.

10. The printer of claim 1 further comprising a print engine coupled to the control unit to apply the print job to a medium.

11. A method comprising:
  receiving a print job to be printed;
  determining if the print job is to be processed according to a formula based workflow; and
  invoking formula based International Color Consortium (ICC) profiles to perform color transformations if the print job is determined to be processed according to the formula based workflow, wherein the formula based profiles manipulate an ICC format using a shaping matrix.

12. The method of claim 1 further comprising invoking a color International Color Consortium (ICC) profile to perform the color managed transformation if the print job is not determined to be processed according to the formula based workflow.

13. The method of claim 11 wherein invoking formula based ICC profiles to perform color transformations comprises:
  generating an input profile to use a Profile Connection Space (PCS) to convey a conversion of a source device color to a target device color;
  generating a black channel or the target device color; and
  generating an output profile to convey the black channel generation.

14. The method of claim 13 further comprising performing color modifications of the black channel of the target device color.

15. The method of claim 14 wherein the color modifications comprise one of Under Color Removal (UCR), Gray Component Replacement (GCR), ink limited secondary colors, black only gray point.

16. The method of claim 15 further comprising storing output profile and each of the color modifications in one or more color lookup tables.

17. An article of manufacture comprising a non-transitory machine-readable medium including data that, when accessed by a machine, cause the machine to perform operations comprising:
  receiving a print job to be printed;
  determining if the print job is to be processed according to a formula based workflow; and
  invoking formula based International Color Consortium (ICC) profiles to perform color transformations if the print job is determined to be processed according to the formula based workflow, wherein the formula based profiles manipulate an ICC format using a shaping matrix.

18. The article of manufacture of claim 17 comprising a non-transitory machine-readable medium including data that when accessed by the machine, further cause the machine to perform operations comprising invoking a color International Color Consortium (ICC) profile to perform the color managed transformation if the print job is not determined to be processed according to the formula based workflow.

19. The article of manufacture of claim 18 wherein invoking formula based ICC profiles to perform color transformations comprises:
  generating an input profile to use a Profile Connection Space (PCS) to convey a conversion of a source device color to a target device color;
  generating a black channel or the target device color; and
  generating an output profile to convey the black channel generation.

20. The article of manufacture of claim 19 comprising a non-transitory machine-readable medium including data that when accessed by the machine, further cause the machine to perform operations comprising performing color modifications of the black channel of the target device color.

* * * * *